United States Patent [19]

Strada et al.

[11] Patent Number: 4,985,181
[45] Date of Patent: Jan. 15, 1991

[54] CENTRIFUGAL PUMP ESPECIALLY FOR AQUARIUMS

[75] Inventors: Antonio Strada, Rubano, Italy; Alain Bertschy, Sarrebourg, France; Giacomo Guoli, Milan, Italy; Edmund J. Mowka, Jr., Mentor, Ohio

[73] Assignee: Newa S.r.l., Italy

[21] Appl. No.: 425,295

[22] Filed: Oct. 23, 1989

[30] Foreign Application Priority Data

Jan. 3, 1989 [IT] Italy ............................ 84101/89[U]
Jan. 3, 1989 [IT] Italy ............................ 84102/89[U]
Jan. 3, 1989 [IT] Italy ............................ 84103/89[U]

[51] Int. Cl.$^5$ ............................................. B01F 3/04
[52] U.S. Cl. .................................... 261/87; 417/63; 417/451; 210/169; 119/5; 415/148
[58] Field of Search ............. 417/63, 423.3, 451; 210/169; 119/3, 5; 415/148; 261/87

[56] References Cited

U.S. PATENT DOCUMENTS

| | | | |
|---|---|---|---|
| 1,293,474 | 2/1919 | Knierim | 417/63 |
| 2,515,538 | 7/1950 | Wall | 261/87 |
| 2,663,261 | 12/1953 | Gage | 417/451 |
| 2,689,670 | 9/1954 | Smith | 417/423.3 |
| 2,997,957 | 8/1961 | Hall | 417/423.3 |
| 3,092,678 | 6/1963 | Braun | 261/87 |
| 3,269,322 | 8/1966 | Lotspih | 417/423.3 |
| 3,482,520 | 12/1969 | Larsen | 261/87 |
| 3,612,722 | 10/1971 | Neward | 417/63 |
| 3,650,950 | 3/1972 | White | 261/87 |
| 3,907,461 | 9/1975 | Bounder | 417/63 |
| 4,002,326 | 1/1977 | Brogli et al. | 415/148 |
| 4,163,035 | 7/1979 | Gorsky | 210/169 |
| 4,193,950 | 3/1980 | Stockner et al. | 261/87 |
| 4,257,748 | 3/1981 | Ives et al. | 417/63 |
| 4,512,724 | 4/1985 | Horvath | 417/319 |
| 4,599,047 | 7/1986 | Nowlin et al. | 417/63 |
| 4,601,821 | 7/1986 | Sherman et al. | 119/5 |
| 4,764,088 | 8/1988 | Kapich | 415/148 |
| 4,859,151 | 8/1989 | Reed | 417/63 |
| 4,861,468 | 8/1989 | Willinger et al. | 210/169 |
| 4,894,151 | 1/1990 | Woltmann | 210/169 |

FOREIGN PATENT DOCUMENTS 828076 2/1960 United Kingdom ................ 210/169

*Primary Examiner*—Tim Miles
*Attorney, Agent, or Firm*—Renner, Otto, Boisselle & Sklar

[57] ABSTRACT

A submersible centrifugal pump especially for aquariums includes a motor driven impeller for circulating water through the pump and a movable flow indicator visible from the exterior of the pump for visually indicating the water flow rate through the pump. The impeller is mounted on a hollow motor shaft which protrudes above the pump to provide for the passage of air down through the shaft for mixing with the water within the pump. The shaft is rotatable relative to the impeller to permit turning of a valve shutter connected thereto relative to a valve seat for controlling the water flow rate through the pump.

44 Claims, 3 Drawing Sheets

CENTRIFUGAL PUMP ESPECIALLY FOR AQUARIUMS

FIELD OF THE INVENTION

The present invention relates to a submersible centrifugal pump especially for aquariums.

BACKGROUND OF THE INVENTION

Pumps used in aquariums are well known. Their function is to make the water circulate through an undergravel filter, and also to oxygenate the water. The usual pump includes an impeller, generally of the centrifugal type, driven by an electrical synchronous motor.

A major drawback of known aquarium water circulation pumps is that they do not provide any indication of the water flow rate through the pump. This is important at the time of regulation in order to create the best water change conditions relative to the dimensions of the aquarium. Also, it is important at the time of verification in order to determine, from the indications of the flow rate, the clogging conditions of the filter. However, adopting an independent instrument to measure the flow rate of an aquarium water circulation pump is not justifiable because of the relatively high cost involved for that particular usage.

It is also generally known to provide aquarium water circulation pumps with an adjustable valve at the pump inlet to regulate the water flow rate through the pump. However, to adjust the valve usually requires a person to immerse his or her hand in the water to reach the valve, making it difficult to adjust.

It has been suggested to provide a separate control shaft for the valve, with an actuator knob on the upper end and suitable gearing on the lower end for operating the valve by rotating the knob externally of the water. However, the required number of parts and complexity of such an assembly makes it too costly to be practical.

Furthermore, it is generally known to oxygenate the water being circulated in an aquarium according to the Venturi effect, by causing the water to flow through a narrowing passage to increase the water speed and thereby reduce the pressure. By ending an external air tube in this narrow passage, the reduction in water pressure at this point creates a suction effect causing air to be drawn through the tube and mixed with the water. A disadvantage of this known method of water oxygenation is that it requires the use of an additional tube which is aesthetically unsightly and adds to the cost of the assemblage. Moreover, its function, based on the Venturi principle, requires a certain speed in the water recycling, thus creating the need for a motor of a certain range just to activate the pump. Furthermore, the Venturi effect creates an undesirable turbulence where the water is readmitted in the aquarium.

SUMMARY OF THE INVENTION

With the foregoing in mind, it is a principal object of this invention to provide a water circulation pump for aquariums with a visual indication of the water flow rate through the pump.

Another object is to provide such a pump with a relatively simple and inexpensive means of providing a visual indication of the water flow rate through the pump.

Still another object is to provide such a pump in which the water flow rate through the pump is easily adjustable to the specific demands.

A further object is to provide such a pump in which the water flow rate can be controlled in a relatively simple and easy manner.

Still another object is to provide such a pump in which the water discharge from the pump can easily be oriented in any desired direction.

Another object is to provide such a pump in which the desired water oxygenation can be achieved in a relatively simple and easy manner without causing substantial water turbulence.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
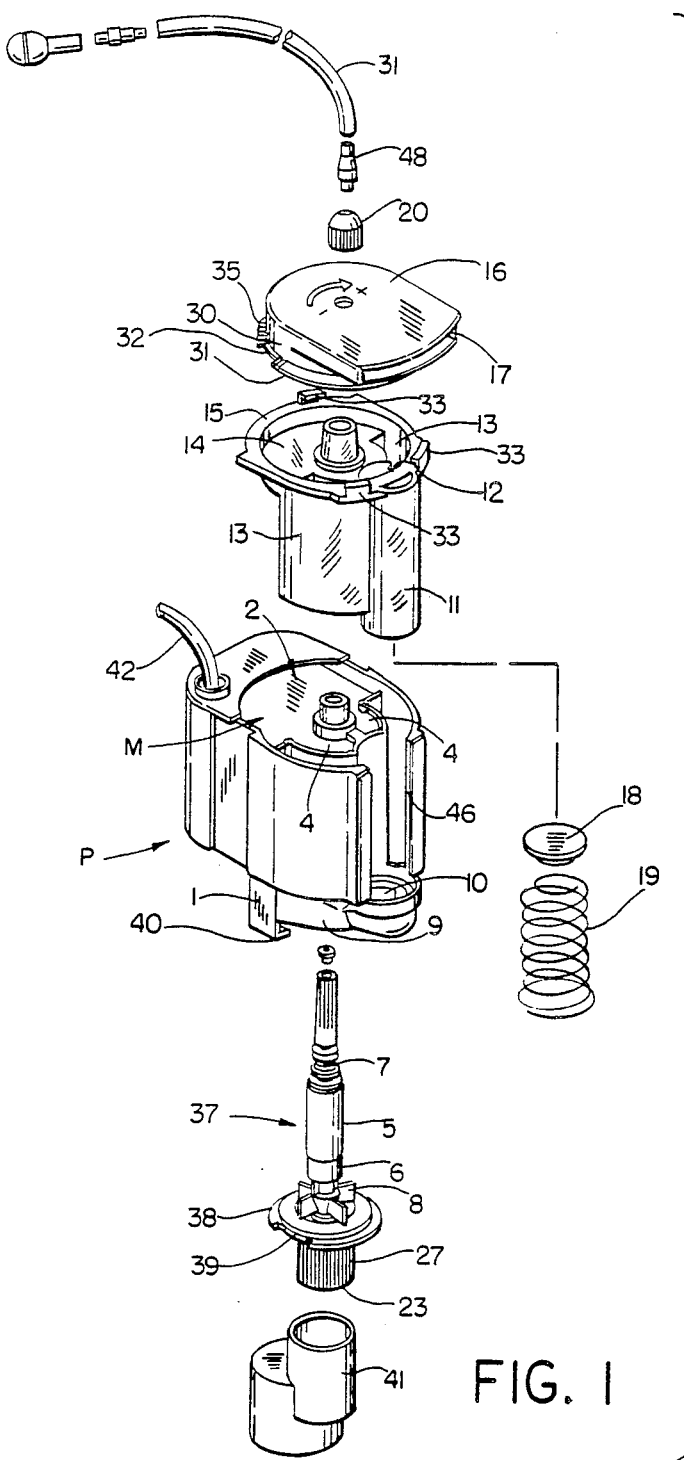
FIG. 1 is an exploded perspective view showing the various components of the pump according to this invention in disassembled form.
Figure 2:
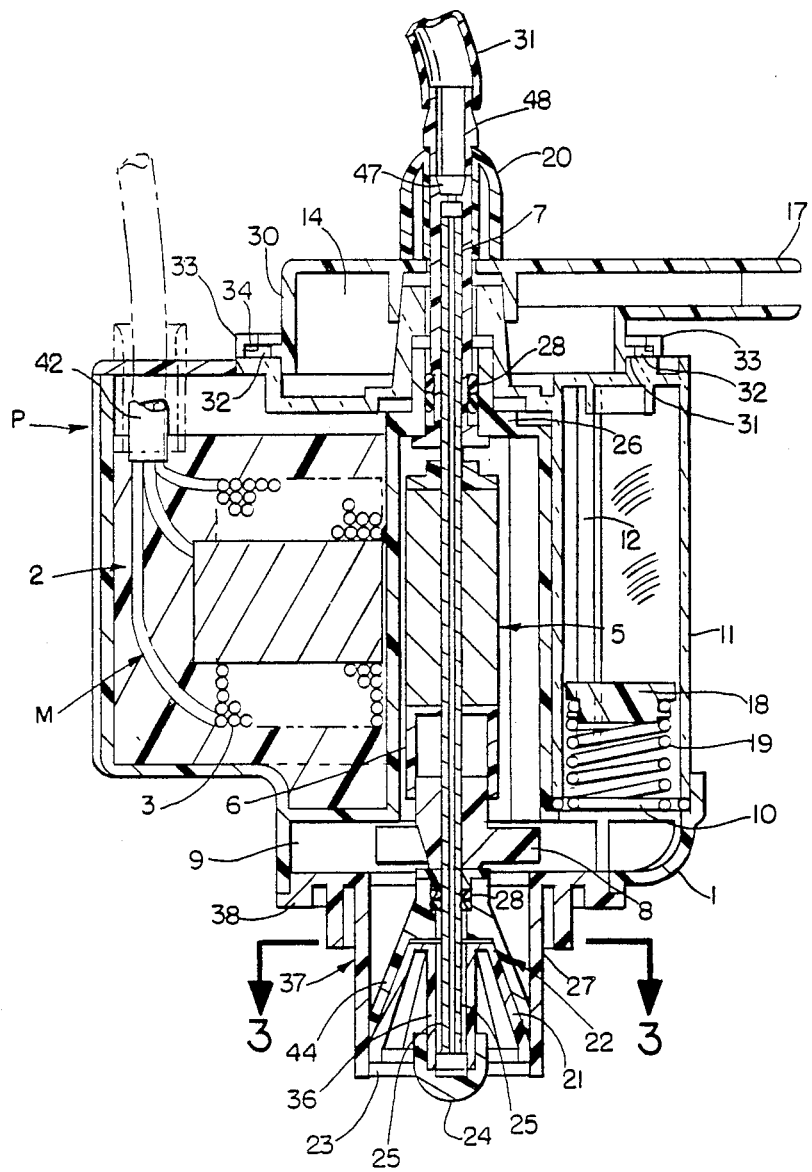
FIG. 2 is an enlarged longitudinal section through the pump of FIG. 1 as assembled.

As can be seen from the drawings, a submersible electrically powered centrifugal water pump P according to the present invention includes a body 1 containing a motor M including a stator 2 made of a plurality of thin, generally U-shaped plates having two arms with coils or windings 3 mounted thereon and encapsulated in a suitable epoxy resin.

Mounted for rotation between the polar shaped extensions 4 of the stator 2 is a cylindrical rotor 5 made of a suitable ferromagnetic material. Rotor 5 is carried by an insulating support 6 freely rotatable on a shaft 7 and is drivingly connected to an impeller 8 furnished with blades. Impeller 8 is disposed in a cylindrical pumping chamber 9 in the body 1. Cylindrical chamber 9 has a delivery opening 10 communicating with a cylindrical tube 11 radially offset from but generally parallel with the support shaft 7. The cylindrical tube 11 is made of a clear plastic material and is closed at its upper end.

Along opposite sides of the cylindrical tube 11 are rectangular openings 12 that communicate with lateral ducts 13 that wrap around the outer surface of the polar shaped extensions 4. The lateral ducts 13 communicate at their upper ends with another cylindrical chamber 14 including a lower portion 15 and an upper portion 16 rotatably mounted with respect to the lower portion 15. Lower portion 15, cylindrical tube 11 and lateral ducts 13 are desirably integrally molded out of a clear plastic material and are removable as a unit from the pump body 1. Within the cylindrical tube 11 is a disc-shaped element 18 which is spring biased toward the delivery opening 10 adjacent the bottom of the tube by a holddown (return) spring 19. The pump body 1 has a vertical slot 46 through which the tube 11 partially extends (see FIGS. 1 and 5) for ease of viewing of the position of the element 18 within the tube 11 for a purpose to be subsequently described.

Upper portion 16 includes a relatively flat water discharge nozzle 17 communicating with the cylindrical chamber 14. Surrounding the base 30 of the upper portion 16 is a radial flange 31 having a plurality of circumferentially spaced slots 32 therein which when aligned with inturned fingers 33 on the lower portion 15, permit the upper portion 16 to be assembled onto the lower portion 15 and when subsequently rotated out of alignment, retain the two parts together. On the underside of each of the inturned fingers 33 is a rib 34 that frictionally engages radial notches 35 on the upper surface of the radial flange 31 to provide some resistance to turning of the upper portion 16 relative to the lower portion 15 for regulating the angular position of the water discharge nozzle 17 with respect to the body 1.

Support shaft 7 is hollow and is inserted, at its upper end, in a control knob 20, and at its lower end, in the shutter portion 21 of a valve 22 located in a water inlet duct 23 to the cylindrical pumping chamber 9 for controlling the water flow rate through the pump in a manner to be subsequently described. Shutter portion 21 includes a hub portion 36 suitably secured to the hollow shaft 7. Hub portion 36 extends slightly below the bottom of the hollow shaft 7 and has two small internal grooves 25 extending along the exterior surface of the shaft 7 to the axial inner end of the hub portion 36 for directing the air passing down through the hollow shaft 7 from the atmosphere toward the rotational axis of the impeller 8. Two axially spaced supports 26 and 27 insure the correct position of the shaft 7 within the body 1, while O-rings 28 provide fluid seals between opposing surface areas. A cap 24 closes off the cavity in the bottom of the valve hub portion 36.

The assembly 37 formed by the shaft 7, O-rings 28, rotor 5, insulating support 6, impeller 8, support 27, valve 22 and cap 24 constitutes a unit that can be preassembled and attached to body 1 by axial insertion and rotation of support 27 relative to body 1. Support 27 has a radial flange 38, with external slots 39 on opposite sides thereof which when brought into alignment with inturned fingers or tabs 40 on the bottom of the body 1, permit the support 27 to be pushed flush up against the bottom side of the body 1 and then rotated to secure the assembly 37 in place.

Figure 5:
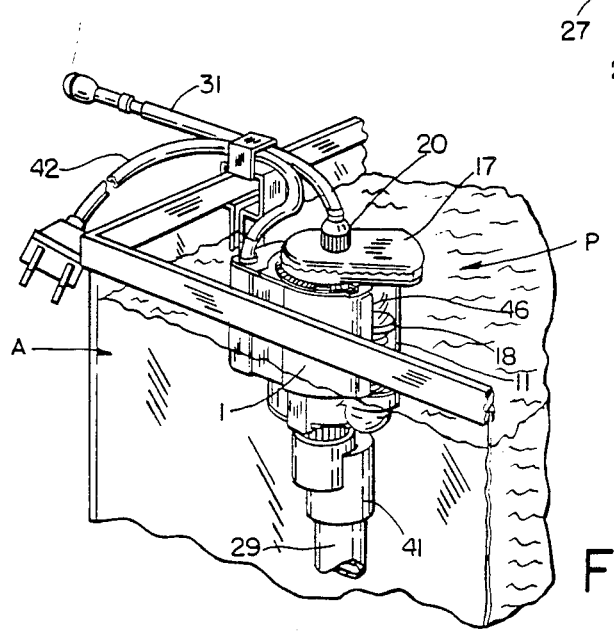
FIG. 5 is a perspective view schematically showing the pump attached to an aquarium.

As schematically shown in FIG. 5, the pump P, which may be provided at the inlet duct 23 with an air lift adaptor 41, is installed internally adjacent the corner of an aquarium A attached, for instance, by a suction cup, at such a height that the water discharge nozzle 17 is substantially at the water level when the air lift adaptor 41 is connected to a tube 29 communicating with an undergravel filter on the bottom of the aquarium below a layer of sand (not shown). In operation, when, through the electric cable 42, the stator 2 is energized, it pulls, in rotation, the rotor 5 which in turn drives the impeller 8. Since the motor is synchronous, the rotational speed of the rotor 5 is fixed in accordance with the power frequency.

Rotation of the impeller 8 produces a centrifugal effect, causing water to be drawn through the tube 29, inlet duct 23 and valve 22 into chamber 9. From chamber 9 water flows out through delivery opening 10 into cylindrical tube 11, then through side openings 12 and lateral ducts 13 into chamber 14 and finally out through delivery nozzle 17. In this way, a complete water circulation is obtained in the aquarium without substantial turbulence due to the fact that the water discharge nozzle 17 is placed at the water level and can be oriented in any desired direction.

Figure 3:
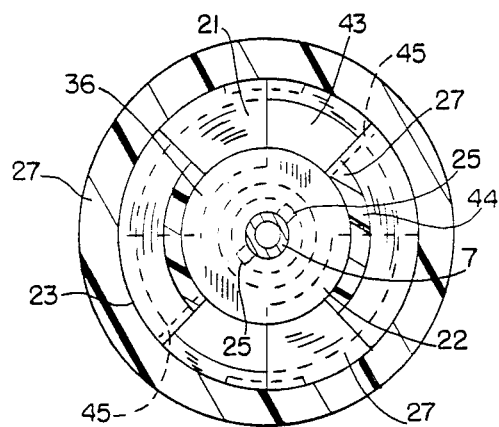
FIG. 3 is a transverse section through the pump inlet, taken generally on the plane of the line 3—3 of FIG. 2.
Figure 4:
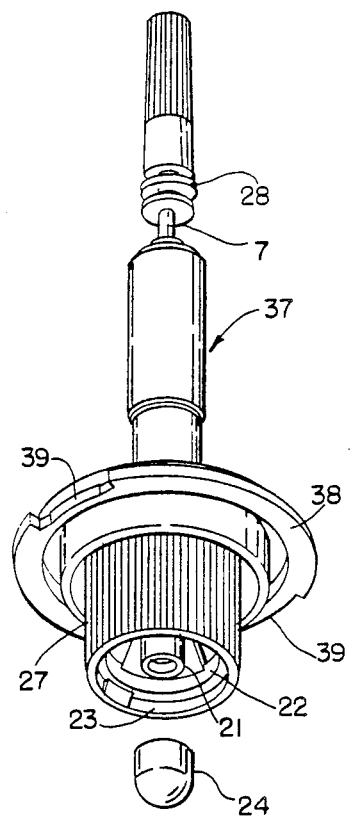
FIG. 4 is a perspective view of a portion of the pump, including the rotating group, that is removable from the pump body as a unit.

The flow rate of water through the pump P can be regulated by turning the control knob 20 which turns shaft 7 and operates valve 22 by rotating one or more valve shutters 21 (two being shown) relative to a corresponding number of flow passages 43 in the seat portion 44 of valve 22 which is disposed in the inlet duct 23. Seat portion 44 is desirably integral with support 27. The valve shutters 21 will more or less cover such flow passages 43 in conformity with the desired opening degree. The shutters 21 are desirably substantially the same size as the flow passages 43 and have the same spacing therebetween, whereby rotation of the shutters 21 relative to the flow passages 43 will change the area of the passages 43 left open by the shutters 21 to change the quantity of water flowing through the passages 43. Radial flanges or ribs 45 on the valve seat 44 adjacent the same side of each passage 43 (see FIG. 3) act as stops limiting rotational movement of the shutters 21 between the fully open and fully closed positions.

As the quantity of water flowing through the passages 43 increases, the force of the water acting on the disc element 18 also increases, overcoming the force of the return spring 19 and causing the disc 18 to move upwardly within the cylindrical tube 11, increasing the length of the rectangular openings 12 useful for the passage of water. For every pump flow rate, there is a corresponding equilibrium position of the disc element 18 within the length of the tube 11. Consequently, the position of the disc element 18 within the tube 11 is indicative of the water flow rate through the pump for the particular valve 22 setting which may be indicated by providing range indications along the sides of the slot 46 in the pump body 1.

Moreover, because the internal grooves 25 in the valve hub portion 36 communicate with a low pressure zone within the pump inlet 23 near the rotational axis of the impeller 8, as long as water is being circulated through the pump, air will be drawn through air passage 47 in the knob 20 down through the axial opening in the shaft 7 and out through the bottom open end of the shaft 7 and then back through the internal grooves 25 for discharge through the flow passages 43 in the valve 22 adjacent the axial inner end of the hub portion 36 of shutter portion 21 to oxygenate the water being circulated through the pump. It is also possible to change the amount of oxygen being mixed with the water by changing, more or less, the size of the air passage 47 through the knob 20. This can be accomplished in various ways, for example, by replacing the knob 20 with other knobs having different size air passages, by furnishing the knob 20 with a control screw, or by attaching to the knob 20 a small tube 31 furnished, at one end, with an interchangeable head 48 for obtaining different aspiration action.

From the foregoing, it will now be apparent that the pump according to this invention has a number of advantages over traditional pumps. Specifically, the pump according to this invention provides an immediate visual indication of the water flow rate through the pump, which is precise and continuous. This provides the advantage of knowing, at any instant, the actual operating conditions of the pump, including, indirectly, from the eventual dropping of the water flow rate, a clogging filter condition. The pump also permits the water flow rate to be regulated in a very simple manner by turning the knob at the outer end of the rotor shaft. Furthermore, the pump provides for the oxygenation of the water while eliminating the aesthetic and functional inconveniences related to a conventional Venturi system. Also, the pump allows for some regulation of the degree of oxygenation of the water. Moreover, the pump according to the present invention achieves all of the above advantages in a relatively simple and reliable manner without the complications and costs of prior known pump designs.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A submersible water pump especially for aquariums comprising a pump body having a water inlet, a water outlet, water passage means between said inlet and outlet, pump means for pumping water from said inlet through said passage means to said outlet, and visual indicating means on said pump body for visually indicating the water flow rate through said pump.

2. The pump of claim 1 wherein said visual indicating means comprises a linearly movable member which is movable in response to changes in the water flow rate through said pump to provide an indication of such water flow rate.

3. The pump of claim 2 wherein said linearly movable member is contained in a portion of said passage means which is made of a clear material visible from the exterior of said pump.

4. The pump of claim 3 wherein said movable member partially interferes with the flow of water through said portion of said passage means, and spring means acts on said movable member in opposition to the force of the water acting on said movable member to cause said movable member to move to different positions of static equilibrium corresponding to different water flow rates through said pump.

5. The pump of claim 4 wherein the area of said portion of said passage means containing said movable member, useful for the passage of water through said pump, changes with changes in the position of said movable member in said portion of said passage means.

6. The pump of claim 4 wherein said portion of said passage means containing said movable member has a delivery opening at one end communicating with said inlet, said movable member being spring biased toward said delivery opening, and a side opening along the length of said portion of said passage means communicating with said outlet, said movable member being movable further away from said delivery opening as the water flow rate through said pump increases to proportionately increase the length of said side opening in communication with said delivery opening.

7. The pump of claim 6 wherein said passage means further comprises a delivery duct extending from said side opening toward said outlet.

8. The pump of claim 7 wherein there are two of said side openings along the length of said portion of said passage means containing said movable member, and two of said delivery ducts extending from said side openings toward said outlet.

9. The pump of claim 8 wherein said passage means further comprises a chamber adjacent the top of said pump body providing communication between said ducts and said outlet.

10. The pump of claim 9 wherein said chamber comprises a bottom wall having openings communicating with said ducts, and a top wall containing said outlet.

11. The pump of claim 10 wherein said top wall includes a relatively flat water discharge nozzle defining said outlet, said top wall being rotatable relative to said bottom wall to permit the water discharge from said pump to be directed in different directions.

12. The pump of claim 10 wherein said top wall is removable from said bottom wall.

13. The pump of claim 10 wherein said chamber, said ducts and said portion of said passage means containing said movable member are removable as a unit from said pump body.

14. The pump of claim 13 wherein said bottom wall of said chamber, said ducts and said portion of said passage means containing said movable member are integrally molded as a single unit.

15. The pump of claim 14 wherein said bottom wall of said chamber, said ducts and said portion of said passage means containing said movable member are made of a clear plastic material.

16. The pump of claim 15 further comprising an opening in said pump body through which said portion of said passage means containing said movable member is visible from the exterior of said pump.

17. The pump of claim 1 further comprising a relatively flat water discharge nozzle containing said outlet, said nozzle being rotatable relative to said pump body for directing the water discharge from said pump in different directions.

18. The pump of claim 1 further comprising a pumping chamber in said pump body, said pump means comprising an impeller within said pumping chamber, and an electric motor including an electrically driven rotor for driving said impeller, and a shaft on which said rotor and impeller are freely rotatable, said shaft being rotatable relative to said rotor and impeller, and valve means including a valve seat within said inlet having openings through which water passes from said inlet to said pumping chamber, and shutter means mounted on said shaft for rotation relative to said valve seat for progressively covering and uncovering said openings.

19. The pump of claim 18 wherein said shaft protrudes above said pump to permit turning of said shaft by hand.

20. The pump of claim 1 further comprising a pumping chamber within said pump body, said pump means comprising an impeller in said pumping chamber and an electric motor including a rotor drivingly connected to said impeller, and shaft means for rotatably supporting said rotor and impeller, said shaft means protruding above said pump, said shaft means being hollow to permit air to be drawn through said shaft means from above said pump for mixing with the water within said pump.

21. The pump of claim 20 further comprising means communicating with the lower end of said shaft means for directing the air passing down through said shaft means along the exterior of said shaft means toward said pumping chamber.

22. The pump of claim 20 wherein said shaft means is rotatable relative to said rotor and impeller, further comprising valve means in said passage means between said inlet and pumping chamber for adjusting the size of said passage means, said valve means including a valve seat having openings through which the water passes from said inlet to said pumping chamber, and shutter means mounted on said shaft means for rotation by said shaft means relative to said valve seat for progressively covering and uncovering said openings.

23. The pump of claim 22 wherein said shutter means has a cavity into which the bottom open end of said shaft means is inserted, and groove means extending from said cavity along the exterior of said shaft means toward said pumping chamber for directing the air passing down through said shaft means back along said shaft means near the rotational axis of said impeller.

24. The pump of claim 23 further comprising a cap on said shutter means covering said cavity.

25. The pump of claim 20 further comprising a knob on the protruding end of said shaft means, said knob having an opening therethrough communicating with said hollow shaft means.

26. The pump of claim 25 wherein said knob is interchangeable with other knobs having different size openings.

27. The pump of claim 25 further comprising a hollow tube connected to said knob, and interchangeable heads at one end of said tube containing different size openings.

28. A submersible water pump for aquariums comprising a pump body containing a pumping chamber, a water inlet and water outlet communicating with said pumping chamber, an impeller in said pumping chamber, motor means for driving said impeller, said motor means including a rotor drivingly connected to said impeller and shaft means for rotatably supporting said rotor and impeller within said pump body, said shaft means being rotatable relative to said rotor and impeller, and valve means in said inlet operable by rotation of said shaft means to control the water flow rate through said inlet.

29. The pump of claim 28 wherein said valve means comprises a valve seat having opening means through which water passes into said pumping chamber, and shutter means mounted on said shaft means for rotation therewith relative to said valve seat for progressively covering and uncovering said openings.

30. The pump of claim 29 wherein said valve seat includes stop means for limiting rotation of said shutter means in opposite directions relative to said valve seat for locating said shutter means in extreme open or closed positions.

31. The pump of claim 28 wherein said shaft means protrudes above said pump to permit turning of said shaft means by hand.

32. The pump of claim 31 further comprising a knob on the protruding end of said shaft means to facilitate turning of said shaft means by hand.

33. The pump of claim 31 wherein said shaft means is hollow to permit air to pass through said shaft means for mixing with the water within said pump.

34. The pump of claim 33 further comprising a knob on the protruding end of said shaft means, said knob having an external opening communicating with said hollow shaft means.

35. The pump of claim 29 wherein said shaft means is hollow to permit air to pass through said shaft means for mixing with the water within said pump, said shutter means including a cavity into which the bottom open end of said shaft means extends, and groove means extending from said cavity along the exterior of said shaft means toward said pumping chamber for directing the air passing down through said shaft means back along said shaft means near the rotational axis of said impeller.

36. The pump of claim 35 further comprising a cap on said shutter means covering said cavity.

37. A submersible water pump for aquariums comprising a pump body containing a pumping chamber, a pump inlet and pump outlet communicating with said pumping chamber, an impeller within said pumping chamber, and motor means for driving said impeller, said motor means including shaft means for rotatably supporting said impeller in said pumping chamber, said shaft means being hollow and protruding above said pump to provide for the passage of air down through said shaft means for mixing with the water within said pump.

38. The pump of claim 37 wherein said shaft means extends downwardly through said pumping chamber terminating in said inlet.

39. The pump of claim 38 further comprising means for directing the air passing down through said shaft means toward said pumping chamber near the rotational axis of said impeller.

40. The pump of claim 39 wherein said means for directing the air passing down through said shaft means toward said pumping chamber comprises hub means containing a cavity into which the bottom open end of said shaft means extends, and groove means extending from said cavity along the exterior of said shaft means toward said pumping chamber for directing the air passing down through said shaft means back along said shaft means near the rotational axis of said impeller.

41. The pump of claim 40 further comprising a cap on said hub means closing said cavity.

42. The pump of claim 37 further comprising a knob on the protruding end of said shaft means, said knob having an external opening communicating with said hollow shaft means.

43. The pump of claim 42 wherein said knob is interchangeable with other knobs having different size openings.

44. The pump of claim 42 further comprising a tube connected to said knob, and interchangeable heads at one end of said tube containing different size openings.

* * * * *